United States Patent
Illsley et al.

(10) Patent No.: US 12,071,551 B2
(45) Date of Patent: Aug. 27, 2024

(54) UV-CURABLE INK COMPOSITION AND A UV-CURED PRINTING PROCESS

(71) Applicant: SUN CHEMICAL CORPORATION, Parsippany, NJ (US)

(72) Inventors: Derek Illsley, Bath (GB); Ajay Popat, Lancashire (GB); Phil Shipham, Lancashire (GB); Samuel Lawton, Lancashire (GB); Samuel Lyth, Lancashire (GB)

(73) Assignee: Sun Chemical B.V., LV Weesp (NL)

( * ) Notice: Subject to any disclaimer, the term of this patent is extended or adjusted under 35 U.S.C. 154(b) by 0 days.

(21) Appl. No.: 18/253,099

(22) PCT Filed: Nov. 23, 2021

(86) PCT No.: PCT/GB2021/053023
§ 371 (c)(1),
(2) Date: May 16, 2023

(87) PCT Pub. No.: WO2022/106854
PCT Pub. Date: May 27, 2022

(65) Prior Publication Data
US 2023/0323143 A1   Oct. 12, 2023

Related U.S. Application Data

(60) Provisional application No. 63/221,104, filed on Jul. 13, 2021, provisional application No. 63/116,969, filed on Nov. 23, 2020.

(51) Int. Cl.
*C09D 11/101* (2014.01)
*B41J 11/00* (2006.01)
*B41M 7/00* (2006.01)
*C09D 11/14* (2006.01)

(52) U.S. Cl.
CPC ....... *C09D 11/101* (2013.01); *B41J 11/00214* (2021.01); *B41M 7/0081* (2013.01); *C09D 11/14* (2013.01)

(58) Field of Classification Search
CPC .......... C09D 11/101; C09D 11/14; C08F 2/50
See application file for complete search history.

(56) References Cited

U.S. PATENT DOCUMENTS

| | | | |
|---|---|---|---|
| 2003/0109599 A1 | 6/2003 | Kamen | |
| 2015/0203696 A1* | 7/2015 | Loccufier | C09D 11/107 347/20 |
| 2019/0111452 A1 | 4/2019 | Illsley | |
| 2020/0399485 A1* | 12/2020 | Illsley | C09D 11/101 |
| 2021/0054220 A1* | 2/2021 | Illsley | B41M 5/50 |
| 2021/0108096 A1* | 4/2021 | Illsley | C08G 65/002 |

FOREIGN PATENT DOCUMENTS

| | | | |
|---|---|---|---|
| CN | 102863848 | 1/2013 | |
| WO | WO2016/186838 | 11/2016 | |
| WO | WO2017095786 | 6/2017 | |
| WO | WO2017160784 | 9/2017 | |
| WO | WO2017/182638 | 10/2017 | |
| WO | WO2018/170086 | 9/2018 | |
| WO | WO-2018165068 A1 * | 9/2018 | ............ B41J 11/002 |
| WO | WO2019/055327 | 3/2019 | |
| WO | WO 2020/012159 A1 | 1/2020 | |
| WO | WO 2021/111134 A1 | 6/2020 | |

OTHER PUBLICATIONS

International Search Report issued in International Application No. PCT/GB2021/053023, mailed Feb. 11, 2022.
Written Opinion of the International Searching Authority issued in International Application No. PCT/GB2021/053023, mailed Feb. 11, 2022.
International Preliminary Report on Patentability (Chapter II of the Patent Cooperation Treaty) issued in International Application No. PCT/GB2021/053023, mailed Mar. 7, 2023.
N. Karaca et.al. in Chapter 1; "Photopolymerisation Initiating Systems", 2018, pp. 1-13 (Polymer Chemistry Series, RSC Publication).

\* cited by examiner

*Primary Examiner* — Jessica M Roswell
(74) *Attorney, Agent, or Firm* — Marian E. Fundytus; Ostrolenk Faber LLP.

(57) ABSTRACT

The invention describes the unique finding that UV-curable flexo (and single pass inkjet) ink compositions can be more effectively cured by curing the pigmented ink compositions through two or more exposures to UV rather than a single exposure, where the total UV dose supplied by the multi-exposure approach is the same or less than the dose supplied by the single exposure.

20 Claims, No Drawings

UV-CURABLE INK COMPOSITION AND A UV-CURED PRINTING PROCESS

CROSS REFERENCE TO RELATED APPLICATIONS

The present application is a § 371 National Phase application based on PCT/GB2021/053023 filed Nov. 23, 2021, which claims the benefit of U.S. Provisional Application Nos. 63/116,969, filed Nov. 23, 2020, and 63/221,104, filed Jul. 13, 2021, the subject matter of each of which is incorporated by reference in their entirety.

The present invention relates to UV-curable ink compositions, methods of preparing them, as well as methods of printing such compositions and printed articles produced thereby. The present invention particularly relates to flexographic printing and flexographic printing ink.

BACKGROUND

CN102863848 discloses UV-LED curable flexo ink compositions comprising photoinitiator concentrations of 15 to 20% (w/w).

WO2017/182638 describes low migration UV-LED curable ink compositions comprising above 5% (w/w) photoinitiators and also does not disclose the benefits of the multi-exposure approach of the present invention.

WO2019/055327 discloses UV-LED low migration flexo ink compositions comprising the monomer 3-methylpentanediol diacrylate. The compositions disclosed do not comprise the aminoacrylates and photoinitiators in the amounts required by the present invention. Furthermore, there is no disclosure of the advantages of the multi-exposure process of the present invention.

WO2018/170086 discloses UV-LED curable low yellowing coating compositions comprising less than 1% (w/w) of a violet pigment and the inventive examples incorporated an aminobenzoate synergist. The compositions disclosed comprise between 7.5 and 12% (w/w) photoinitiator. The inks of the present invention comprise aminoacrylates and can be prepared essentially free of any aminobenzoate.

An issue facing the curing of flexo (and inkjet) inks when cured in air, especially with UV-LED light sources, is that oxygen inhibition can retard the cure. In particular, this oxygen inhibition can present itself as poor surface cure.

WO2018/170086 further describes the issues facing the UV-curing of flexo inks, including oxygen inhibition at print surfaces and the weaker capacity of UV-light emitted by UV-LED lamps in the 365-405 nm wavelength range to effect surface cure, compared with shorter wavelength UV light. WO2018/170086 also describes some of the measures which have been taken to overcome oxygen inhibition including; nitrogen inertion, incorporation of oxygen scavengers, using UV-LED lamps with a mixed array of LEDs emitting over a range of wavelengths and the use of mercaptans as a chain transfer agent. None of these approaches are ideal. For example, Nitrogen inertion requires additional capital and running costs. It is preferred to have an ink which can cure in ambient air at high speed using low photoinitiator concentrations. Further, photoinitiators are an expensive component of an ink and minimizing their content in inks is commercially advantageous. Moreover, using an array of UV-LED lamps emitting at different wavelengths is less efficient and requires increased costs due to of use of more lamps than required in the present invention. UV-LED lamps emitting at shorter wavelengths are lower powered and require also specific additional photoinitiators effective at lower wavelengths. Oxygen scavengers can have a negative impact on cure, as they interact with the free radicals generated during the UV-curing process. Finally, mercaptans can have an unpleasant odour and also react with acrylates, via Michael addition, causing instability issues with ink formulation. The present invention provides a highly pragmatic way of overcoming the issue of oxygen inhibition that avoids the problems associated with the prior art.

Furthermore, almost invariably when assessing the cure performance of UV-curable flexo (and inkjet) inks it is the norm to determine the cure response as a factor of the UV-dose as applied through a single exposure from the UV-light source or by the maximum speed on a press, with a single UV-light source, that still delivers acceptable cure.

SUMMARY OF THE INVENTION

The inventors have discovered an ink comprising less than 5% (w/w) photoinitiator and an aminoacrylate can be effectively cured using UV light. This is advantageous as reducing the amount of photoinitiator present reduces the amount of migratable species present in the cured composition.

The present invention provides a UV-curable ink composition comprising ≤20% (w/w) of any blend of monofunctional acrylate monomers, an acrylated amine and ≤5% (w/w) of any blend of photoinitiators. The ink of the invention can be a flexographic ink.

The inventors have found that the pigmented UV-curable flexo inks of the invention can be satisfactorily cured with total UV doses of less than or equal to 200 mJ/cm$^2$, such as less than or equal to 100 mJ/cm$^2$ through a multi-exposure approach. Where the inks are cured via two or more exposures the inventors have found that the cure of the inks, especially the surface cure, is much more effective than if the inks are cured through a single exposure where the UV dose is equal to, or indeed greater, than the sum of the individual exposures of the multi-exposure process. This is a key finding as it enables the printing of UV flexo (and inkjet) inks at increased press speeds, a highly desirable feature of the invention. A further potential advantage is the configuration of flexo (and inkjet) presses with lower power UV-LED lamps, with benefits of cooling and lowering overall power consumption. Thus, the invention enables the successful printing of UV-curable flexo inks with total UV doses as low as 200 mJ/cm$^2$ or less, such as 100 mJ/cm$^2$, and even lower.

The invention is suitable for a number of applications, including both narrow and mid-width web printing, encompassing the printing of labels, plastic and metal foil films. A further feature of the invention is where photoinitiators suitable for low migration printing are used, such that the inks of the invention may be used successfully in the printing of food packaging substrates.

The flexo (and inkjet) ink compositions of the present invention comprise an aminoacrylate.

The pigmented inks of the invention typically include greater than 2.0% (w/w) of any blend of organic or inorganic pigments. The inks of the invention may comprise an ink set comprising at least a cyan, magenta, black and yellow inks.

DETAILED DESCRIPTION OF THE INVENTION

Definitions (w/w)=the weight percentage of a component relative to the total weight of the composition, i.e. the UV-curable ink composition of the invention.

Single pass inkjet printing=a printing process where the inkjet printheads are fixed and the substrate passes underneath the printheads either as a reel or is sheetfed. A single pass inkjet press capable of a multi-UV exposure process may comprise two or more UV light sources positioned after the printing stations in order to provide the multiple irradiations required by the method of the invention in a single pass of the inkjet head.

Multipass inkjet printing=the printheads passes over the substrate multiple times to build up the print image. A single UV light source could be used with multipass inkjet printing to provide multiple irradiations.

The Invention

The invention describes the unique finding that UV-curable flexo (and single pass inkjet) ink compositions of the invention can be more effectively cured by curing the pigmented ink compositions through two or more exposures to UV rather than a single exposure, where the total UV dose supplied by the multi-exposure approach is the same or less than the dose supplied by the single exposure. This finding is especially useful for the UV-LED curing of flexo compositions, and especially so for pigmented ink compositions comprising less than 5% (w/w) of photoinitiators and greater than 2.0% of an organic or inorganic pigment.

Although the invention is directed towards the use of solely UV-LED lamps it should be understood that it will also cover the instance where a series of UV-LED lamps are used according to the invention, in combination with a final medium pressure mercury UV-lamp or indeed any other UV-light source.

UV Printing Process

The multi-exposure UV-LED curing process that forms part of the invention is significantly more effective in curing flexo (and inkjet) inks than a single exposure of the equivalent, or indeed greater, total dose than is delivered by the separate exposures of the multi-exposure process. There are a number of advantages associated with this:

1. A more energy efficient curing process, with consequent energy savings.
2. The potential for using lower power UV-LED lamps at the end of a printing process which again would be beneficial. Although higher power lamps are being developed the heat output from these often requires water-cooling with the associated undesirable requirements for plumbing and pumping.
3. Following on from (2), the invention enables faster press speeds for UV-LED flexo.
4. It allows for the use of lower photoinitiator concentrations than would be required with a single exposure curing process. Lower concentrations of photoinitiators has the benefit of reduced migration risk for food packaging applications.

From the press side it is perfectly conceivable that presses using lower power UV-LED lamps at the end of the printing process could be configured with the benefits of lower capital cost and energy savings. Higher power UV-LED lamps are continuing to be developed but an issue with such lamps (with power outputs of 20 W/cm, or greater) is that often water cooling is required with entrained issues of plumbing, pumps, and the like. Using lower powered air-cooled UV-LED lamps is clearly beneficial. Thus, a further optional aspect of the invention is that at least one of the UV-LED lamps used in the inventive process is air-cooled.

UV Light

Although curing via UV-LED light sources emitting in the 380-410 nm range is preferred, the invention will allow for the printing of flexo (and inkjet) inks, using UV-LED light sources emitting at wavelengths of 385 nm, or less. There are technical advantages, as well as commercial advantages, associated with this, as the invention will allow for the successful use of these lower power light sources.

The effective and high-speed printing of flexo (and inkjet) inks by UV-LED curing is highly desirable as a switch from mercury lamps is sought in the industry. The inks of the invention may be cured using UV light source emitting at a wavelength of 350 nm or higher.

UV Lamps

A further commercial benefit of the inventive process is that it will allow the use of lower power and more efficient UV-LED lamps to be used. Although higher power UV-LED lamps are continually being developed, an issue associated with their use is that of cooling, often requiring water-cooling with the entrained plumbing and pumping, not a desirable engineering feature. By using lower power lamps, air-cooling is practical, making such lamps more compact and simpler to install and maintain in a press environment. Thus, a further optional feature of the invention is that at least one of the UV-LED lamps of the printing process should be air-cooled. Yet a further aspect of the invention is that at least one of the UV-LED lamps of the process should preferably have a peak irradiance power output of 24 $W/cm^2$, or less, and more preferably 20 $W/cm^2$ or less. Peak irradiance is the radiant power arriving at a surface per-unit area. The UV lamps used in the method of the invention may have a peak in the wavelength range above 350 nm, such as between 365 and 405 nm, or between 380 and 410 nm. Having a peak in the wavelength range means that the maximum value of the emission intensity is within said wavelength range.

UV Dosage Regimes

The finding that significantly improved cure can be achieved by exposing flexo (and inkjet) inks of the invention to two or more exposures from the output of UV-LED light sources rather than a single exposure where the total doses delivered by the multi-exposure process are equivalent, or less, is one which has not been adequately disclosed, or alluded to, in the prior art. Thus, for example, the inventors have shown that inks prepared according to the invention cure very much more effectively when exposed to two 50 $mJ/cm^2$ or four 25 $mJ/cm^2$ exposures from a 395 nm UV-LED light source than is possible with a single exposure of 100 $mJ/cm^2$. Indeed, in further experiments it has been shown that three 25 $mJ/cm^2$ exposures can deliver superior cure, especially surface cure, than the single 100 $mJ/cm^2$ exposure. These findings confirm and support the principal tenet of the invention and show the potential technical and commercial benefits that might accrue.

Thus, an aspect encompassed by the invention is that satisfactory surface cure of flexo (and inkjet) inks can be achieved at a lower total dose via two or more exposures to a UV-LED light source than can be achieved by a single exposure.

The implications for this are that a more energy efficient curing process will ensue for a given press speed and that for the same total UV dose faster press speeds will be achievable. Yet a further benefit is that the inventive process allows for the preparation of inks with a lower photoinitiator requirement than would be previously thought possible. Yet a further benefit of the invention is that it will allow presses to be configured where at least one of the UV-LED lamps of the process is air-cooled.

The inventors do not wish to be bound by any particular theory but postulate that the superior (surface) cure achieved by applying two or more lower dose UV exposures than a single UV exposure of the same, or greater, total dose is likely to be related to a reduction in the impact of oxygen inhibition. Oxygen inhibition is a particular and well recognized problem for low viscosity ink and coating compositions, such as UV flexo and inkjet, resulting in a retardation of the free radical polymerization of the acrylate monomers which are typically used. For low viscosity fluids, like UV flexo and inkjet inks, atmospheric oxygen may rapidly diffuse into the curing ink and retard the cure by producing stable peroxy radicals by reaction of biradical oxygen with active, initiating and propagating free radicals. The inventors postulate that by curing a flexo (or inkjet) ink by two or more lower dose UV exposures rather than a single high dose exposure helps overcome the effects of oxygen inhibition by inducing an increase in ink viscosity in the first and succeeding exposures of the inventive process. This increase in viscosity reduces the rate of oxygen ingress into the ink print thereby reducing the effect of oxygen inhibition in the subsequent UV exposures, enabling a more energy efficient curing process. The relationship between ink viscosity and oxygen inhibition is one well understood by those skilled in the art and the inventive process is one which aims to address this in a practical way. Obviously, the effects of oxygen inhibition will present themselves more significantly in the uppermost surface of the ink print. For this reason, the invention is especially effective in enhancing the surface cure of UV flexo (and inkjet) inks for any given total UV dose.

The inventors have demonstrated the benefits of the invention by assessing the improvements in surface cure by a simple method. This involves curing the inks of the invention and then blocking the print surface to paper and measuring the surface cure as a function of the amount of ink from the print which transfers to the paper. The amount of ink transferred to the paper is measured via a spectrophotometric method, as described in the examples.

To help put the invention into context the inventors have prepared a number of inks and shown that the surface cure is more effectively achieved by curing with a 395 nm UV-LED lamp when exposed to a total doses of 50 to 400 mJ/cm$^2$ which is delivered in two or more, such as three or more, or four or more, exposures rather than a single exposure. Thus, the process of the invention may involve curing inks of the invention by supplying a total UV dose of between 50 and 400 mJ/cm$^2$, and more preferably between 50 and 300 mJ/cm$^2$ by two or more individual UV exposures. For the printing of flexo inks it is preferred that the total dose supplied by the individual exposures of the process should be 400 mJ/cm$^2$ or less, such as 350 mJ/cm$^2$ or less, 300 mJ/cm$^2$ or less, 250 mJ/cm$^2$ or less, 200 mJ/cm$^2$ or less, 180 mJ/cm$^2$ or less, or 100 mJ/cm$^2$ or less. These individual UV exposures may be equivalent in dose or may vary in dose. Thus, it can be envisaged that a press could be configured with UV-LED lamps of varying power output after the final printing station to deliver the inventive features. For example, low power UV-LED lamps of, for example, 4 to 18 W/cm$^2$ could be used to deliver the earlier exposures with higher power UV-LEDs then being used to achieve the desired surface cure. The process of the invention may comprise exposure to two or more separate UV irradiations from UV-LED lamps, wherein the first irradiation provides a cure dose of less than 100 mJ/cm$^2$ and a subsequent irradiation provides a cure dose greater than or equal to 100 mJ/cm$^2$. For example, the process of the invention may comprise exposure to two or more separate UV irradiations from UV-LED lamps, wherein the first irradiation provides a cure dose of less than or equal to 50 mJ/cm$^2$ and a subsequent irradiation provides a cure dose greater than or equal to 100 mJ/cm$^2$, such as greater than or equal to 120 mJ/cm$^2$. Obviously, this is merely an illustrative example of how the inventive curing process may be configured and should not be construed as limiting in any way.

Equally, it could be envisaged that a press could be fitted with a series of 14 W/cm$^2$ or 18 W/cm$^2$ air cooled UV-LED lamps after the final printing station to deliver the desired surface cure. Yet a further feature of the invention is that it allows the use of UV-LED lamps emitting UV-light in the 385-405 nm range to achieve desired surface cure without recourse to lamps emitting at lower wavelengths, as indicated by WO2018/170086. However, it should be understood that the invention covers the use of UV-LED lamps emitting at any wavelength between 325 and 405 nm, and more preferably between 365 and 405 nm. At least one of the UV-LED lamps used in the method of the invention may preferably be one which is air-cooled for the reasons previously outlined.

The process of the invention may involve printing the inks with a press speed of 30 m/min or greater, such as 40 m/min or greater, 50 m/min or greater, 60 m/min or greater, 100 m/min or greater, 150 m/min or greater, or 200 m/min or greater. For example, the process of the invention may involve printing the inks with a press speed of 150 m/min or greater, wherein the ink is cured with exposure to two or more separate UV irradiations from UV-LED lamps, with a total UV exposure of less than 200 mJ/cm$^2$. The specific components of the ink of the invention in combination with the specific dosage regimes disclosed herein, facilitates the increased press speeds of the method of the invention. By increasing the press speed, productivity is increased as printing can be completed faster and more efficiently, consuming less energy.

UV-Curable Inks

Although the invention is directed towards a process for curing UV-curable flexo inks, the process also lends itself to the single pass printing of other inks, for example inkjet inks. In all cases the inventive process enables a number of inventive ink features.

Photoinitiators

The inks of the invention comprise total photoinitiator concentrations of ≤5.0% (w/w), and more preferably ≤4.0% (w/w). The inks of the invention may comprise ≤3.0% (w/w) photoinitiator. The photoinitiator preferably comprises a blend of thioxanthones and acylphosphine oxides. It should be understood that other photoinitiator types may be used, but this combination is especially effective, and especially when UV-LED lamps emitting at 385 to 405 nm are used.

The UV-curable ink compositions of the invention comprise less than 5.0% (w/w), such as less than 4.0% (w/w), or less than 3% (w/w) of a blend of photoinitiators comprising any thioxanthone, or derivative thereof, and any acylphosphine oxide.

Suitable thioxanthone photoinitiators which may be used include, but are not limited to; 2-isopropylthioxanthone, 4-isopropylthioxanthone, 2,4-diethylthioxanthone, 2,4-diisopropylthioxanthone, 2-chlorothioxanthone, 2-chloro-4-isopropylthioxanthone. Oligomeric/polymeric thioxanthones such as Omnipol TX (ex. IGM Resins) and Genopol TX (ex. Rahn) may be used. Polymerizable thioxanthones such as Omnipol 3ATX (ex. IGM Resins) may also be used. The oligomeric/polymeric and polymerizable derivatives are especially suited to low migration printing applications including the printing of food packaging, a further feature encompassed by the present invention. The capacity of the invention to enhance the surface cure is especially advantageous for low migration printing as it will reduce the risk associated with the migration of uncured monomers, oligomers and photoinitiators from the uppermost surface of a cured ink.

Suitable acylphosphine oxide photoinitiators include, but are not limited to; diphenyl-(2,4,6-trimethylbenzoyl)-phosphine oxide, ethyl-(2,4,6-triemthylbenzoyl) phenyl phosphinate, phenylbis(2,4,6-trimethylbenzoyl)-phosphine oxide, and oligomeric/polymeric types such as Omnipol TP and Omnirad 820 (ex. IGM Resins). The latter three photoinitiators are especially suited to low migration printing applications.

The blend of thioxanthone and acylphosphine oxide photoinitiators form ≤5.0% (w/w), or more preferably ≤4.0% (w/w) of the ink composition. The inventors have shown that it is possible to prepare inks with photoinitiator contents of ≤4.0% (w/w) that can deliver acceptable surface cure when cured using the inventive process within the limits of the total cure dose, previously outlined.

The ink composition of the invention may comprise at least 0.01% (w/w) of any blend of photoinitiators, such as at least 0.5 wt % (w/w), at least 1% (w/w), at least 2% (w/w), or at least 3% (w/w) of any blend of photoinitiators.

An acylphosphine oxide photoinitiator may be present in an amount between 0.01% and 5% (w/w), such as 0.01% and 4% (w/w), 0.01% and 3% (w/w), 0.01% and 2% (w/w), 0.5% and 5% (w/w), 0.5% and 4% (w/w), 0.5% and 3% (w/w), or 0.5% and 2% (w/w). The acylphosphine oxide photoinitiator may be present in an amount of 5% (w/w) or less, such as less than 5% (w/w), 4% (w/w) or less, 3% (w/w) or less, or 2% (w/w) or less.

The thioxanthone photoinitiator may be present in an amount between 0.01% and 5% (w/w), such as 0.01% and 4% (w/w), 0.01% and 3% (w/w), 0.5% and 3% (w/w), 1% and 5% (w/w), 1% and 4% (w/w), 1% and 3% (w/w), or 2% and 3% (w/w). The thioxanthone photoinitiator may be present in an amount of 5% (w/w) or less, such as 4% (w/w) or less, or 3% (w/w) or less.

The thioxanthones and acylphosphine oxide photoinitiators may be blended in any ratio but preferably the ratio should be in the range 10:1 and 1:10 of thioxanthone to acylphospine oxide, more preferably in the range 4:1 and 1:4, and even more preferably in the range 2:1 to 1:4.

A further advantageous reason when curing in air, for the defined photoinitiator blend, is that the use of type II photoinitiators, including diethylthioxanthone (DETX) as used in the examples, is beneficial. Such photoinitiators, although known to work in combination with aminoacrylates, may also further benefit from the multi-exposure UV processes encompassed by the invention. Again, the inventors do not wish to be held to any theory but again postulate that type II photoinitiators may be regenerated to an extent through oxidative processes between each UV exposure (e.g. N. Karaca et.al. in Chapter 1; "Photopolymerisation Initiating Systems", 2018, pp 1-13 (Polymer Chemistry Series, RSC Publication). If this occurs, then it would be clearly beneficial to the multi-UV exposure aspect of the invention, as the type II photoinitiator would be regenerated to an extent between UV exposures making it available for subsequent UV exposures.

There is no restriction on the type, blend or concentration of free radical photoinitiators used, other than those previously mentioned, and can include any of, but not limited to the following (and combinations thereof):

a) α-hydroxyketones such as; 1-hydroxy-cyclohexyl-phenyl-ketone; 2-hydroxy-2-methyl-1-phenyl-1-propanone; 2-hydroxy-2-methyl-4'-tert-butyl-propiophenone; 2-hydroxy-4'-(2-hydroxyethoxy)-2-methyl-propiophenone; 2-hydroxy-4'-(2-hydroxypropoxy)-2-methyl-propiophenone; oligo 2-hydroxy-2-methyl-1-[4-(1-methyl-vinyl)phenyl]propanone; bis[4-(2-hydroxy-2-methylpropionyl)phenyl]methane; 2-Hydroxy-1-[1-[4-(2-hydroxy-2-methylpropanoyl)phenyl]-1,3, 3-trimethylindan-5-yl]-2-methylpropan-1-one and 2-Hydroxy-1-[4-[4-(2-hydroxy-2-methylpropanoyl)phenoxy]phenyl]-2-methylpropan-1-one;

b) acylphosphine oxides such as; 2,4,6-trimethylbenzoyl-diphenylphosphine oxide; ethyl (2,4,6-trimethylbenzoyl) phenyl phosphinate, bis-(2,4,6-trimethylbenzoyl)-phenylphosphine oxide; and bis(2,6-dimethoxybenzoyl)-2,4,4-trimethylpentylphosphinoxide.

c) α-aminoketones such as; 2-methyl-1-[4-methylthio)phenyl]-2-morpholinopropan-1-one; 2-benzyl-2-dimethylamino-1-(4-morpholinophenyl)-butan-1-one; and 2-dimethylamino-2-(4-methyl-benzyl)-1-(4-morpholin-4-yl-phenyl)-butan-1-one;

d) thioxanthones such as; 2-4-diethylthioxanthone, isopropylthioxanthone, 2-chlorothioxanthone, and 1-chloro-4-propoxythioxanthone;

e) benzophenones such as; such as benzophenone, 4-phenylbenzophenone, and 4-methylbenzophenone; methyl-2-benzoylbenzoate; 4-benzoyl-4-methyldiphenyl sulphide; 4-hydroxybenzophenone; 2,4,6-trimethyl benzophenone, 4,4-bis(diethylamino)benzophenone; benzophenone-2-carboxy(tetraethoxy)acrylate; 4-hydroxybenzophenone laurate and 1-[-4-benzoylphenylsulpholphenyl]-2-methyl-2-(4-methylphenylsulphonyl)propan-1-one;

f) phenylglyoxylates such as; phenyl glyoxylic acid methyl ester; oxy-phenyl-acetic acid 2-[hydroxyl-ethoxy]-ethyl ester, or oxy-phenyl-acetic acid 2-[2-oxo-2-phenyl-acetoxy-ethoxy]ethyl ester;

g) oxime esters such as; 1-phenyl-1,2-propanedione-2-(O-ethoxycarbonyl)oxime; [1-(4-phenylsulfanylbenzoyl) heptylideneamino]benzoate, or [1-[-ethyl-6-(2-methylbenzoyl)carbazol-3-yl]-ethylideneamino]acetate.

Examples of other suitable photoinitiators include diethoxy acetophenone; benzil; benzil dimethyl ketal; titanocen radical initiators such as titanium-bis(n 5-2,4-cyclopentadien-1-yl)-bis-[2,6-difluoro-3-(1H-1-yl)phenyl]; 9-fluorenone; camphorquinone; 2-ethyl anthraquinone; and the like.

Polymeric photoinitiators and sensitizers are also suitable, including, for example, polymeric aminobenzoates (GENOPOL AB-1 or AB-2 from RAHN, Omnipol ASA from IGM or Speedcure 7040 from Lambson), polymeric benzophenone derivatives (GENOPOL BP-1 or BP-2 from RAHN, Omnipol BP, Omnipol BP2702 or Omnipol 682 from IGM or Speedcure 7005 from Lambson), polymeric thioxanthone derivatives (GENOPOL TX-1 or TX-2 from RAHN, Omnipol TX from IGM or Speedcure 7010 from Lambson), polymeric aminoalkylphenones such as Omnipol 910 from IGM; polymeric benzoyl formate esters such as Omnipol 2712 from IGM; and the polymeric sensitizer Omnipol SZ from IGM.

Aminoacrylates

The ink compositions of the invention also comprise an aminoacrylate (also referred to herein as an acrylated amine). Aminoacrylates are the products of the reaction between an acrylate functional monomer or oligomer and a primary or secondary amine. Aminoacrylates include amine-modified polyether acrylates.

Aminoacrylates for use with the present invention include but are not limited to; EBECRYL 80, EBECRYL 81, EBECRYL 83, EBECRYL 85, EBECRYL 880, EBECRYL LEO 10551, EBECRYL LEO 10552, EBECRYL LEO 10553, EBECRYL 7100, EBECRYL P115, EBECRYL P116, EBECRYL LED 03, available from ALLNEX; CN501, CN550, CN UVA421, CN3705, CN3715, CN3755, CN381 and CN386, all available from Sartomer; GENOMER 3430, GENOMER 5142, GENOMER 5161, GENOMER 5271 and GENOMER 5275 from RAHN; PHOTOMER 4250, PHOTOMER 4771, PHOTOMER 4967, PHOTOMER 5006, PHOTOMER 4775, PHOTOMER 5662, PHOTOMER 5850, PHOTOMER 5930, and PHOTOMER 4250 all available from IGM, LAROMER LR8996, LAROMER LR8869, LAROMER LR8889, LAROMER LR8997, LAROMER PO 83F, LAROMER PO 84F, LAROMER PO 94F, LAROMER PO 9067, LAROMER PO 9103, LAROMER PO 9104, LAROMER PO 9106 and LAROMER P077F, all available from BASF; AGISYN 008, AGISYN 701, AGISYN 702, AGISYN 703, NeoRad P-81and NeoRad P-85 ex DSM-AGI.

Furthermore, the aminoacrylates disclosed in WO2016186838, WO2017095786 and WO2017160784 by way of the descriptions and examples are also encompassed by the present invention.

Although there is no restriction on the amount of aminoacrylate that might be used in the inventive compositions it is preferred that at least 2.0% (w/w), more preferably at least 4.0% (w/w), more preferably at least 5.0% (w/w), more preferably at least 7.0% (w/w), and more preferably at least 8.0% (w/w) should be used.

For the UV-curing of flexo inks the inventors have found that the aminoacrylate (Photomer 4250) with the following chemical structure is especially effective:

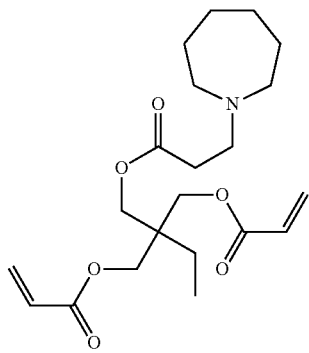 [SMILES: C=CC(=O)OCC(CC)(COC(=O)C=C)COC(=O)CCN1CCCCCC1]

Aminobenzoate type amine synergists may also be optionally used. However, inks of the invention with acceptable performance can be prepared which are essentially free of any aminobenzoate amine synergist.

Mercaptans and thio-ether synergists may also be optionally used but their use is less favorable due to the associated odor.

Cellulose Acetates

The inventors have also surprisingly found that the inclusion of a cellulose acetate propionate (CAP) or a cellulose acetate butyrate (CAB) can promote the cure of UV flexographic inks cured according to the inventive process and therefore their use is included as an optional feature of the invention. CAPs and CABs have been found to significantly enhance the surface cure of inks when they are cured by the multi-exposure UV-LED process of the invention. There is no limit on the concentration of CAP or CAB incorporation, but it is preferred that greater than 0.5% (w/w) and preferably greater than 1.0% (w/w) is used. The inventors do not wish to be drawn to any particular theory as to why CAPs or CABs should be effective in promoting the surface cure but postulate that the ether groups present in the molecular structure may contribute in the photoinitiation process.

Radically Polymerizable Monomers and Oligomers

The invention is directed towards flexo ink compositions, comprising any blend of ethylenically unsaturated monomers and oligomers, and especially those monomers and oligomers comprising acrylate groups. However, it should be understood that the invention also encompasses the single pass printing of UV-inkjet compositions or other ink types. The invention also encompasses hybrid presses where any combination of flexo and inkjet printing stations is used to generate printed matter.

Compositions according to the invention may comprise any amount of any blend of free radically polymerizable monomers and oligomers.

A feature of the invention is that the concentration of monofunctional monomers should be less than 20.0% (w/w), and more preferably less than 15.0% (w/w), more preferably less than 10.0% (w/w), and even more preferably less than 5.0% (w/w) of the total ink composition. The ink of the invention may comprise no monofunctional monomers.

Examples of suitable multifunctional ethylenically unsaturated monomers include but are not limited to those of the following paragraph (and combinations thereof), where the terms ethoxylated refers to chain extended compounds through the use of ethyleneoxide, propoxylated refers to chain extended compounds through the use of propylene oxide, and alkoxylated refers to chain extended compounds using either or both ethylene oxide and propylene oxide. Equivalent methacrylate compounds are also capable of being used, although those skilled in the art will appreciate that methacrylate compounds have lower reactivity than their equivalent acrylate counterparts:

Suitable multifunctional ethylenically unsaturated monomers include 1,3-butylene glycol diacrylate; 1,4-butanediol diacrylate; neopentyl glycol diacrylate; ethoxylated neopentyl glycol diacrylate; propoxylated neopentyl glycol diacrylate; 2-methyl-1,3-propanediyl ethoxy acrylate; 2-methyl-1,3-propanediol diacrylate; ethoxylated 2-methyl-1,3-propanediol diacrylate; 3 methyl 1,5-pentanediol diacrylate; 2-butyl-2-ethyl-1,3-propanediol diacrylate; 1,6-hexanediol diacrylate; alkoxylated hexanediol diacrylate; ethoxylated hexanediol diacrylate; propoxylated hexanediol diacrylate; 1,9-nonanediol diacrylate; 1,10 decanediol diacrylate; ethoxylated hexanediol diacrylate; alkoxylated hexanediol diacrylate; diethyleneglycol diacrylate; triethylene glycol diacrylate; tetraethylene glycol diacrylate; polyethylene glycol diacrylate; propoxylated ethylene glycol diacrylate; dipropylene glycol diacrylate; tripropyleneglycol diacrylate; polypropylene glycol diacrylate; poly (tetramethylene glycol) diacrylate; cyclohexane dimethanol diacrylate; ethoxylated cyclohexane dimethanol diacrylate; alkoxylated cyclohexane dimethanol diacrylate; polybutadiene diacrylate; hydroxypivalyl hydroxypivalate diacrylate; tricyclodecanedimethanol diacrylate; 1,4-butanediylbis[oxy(2-hydroxy-3,1-propanediyl)]diacrylate; ethoxylated bisphenol A diacrylate; propoxylated bisphenol A diacrylate; propoxylated ethoxylated bisphenol A diacrylate; ethoxylated bisphenol F diacrylate; 2-(2-Vinyloxyethoxy)ethyl acrylate; dioxane glycol diacrylate; ethoxylated glycerol triacrylate; glycerol propoxylate triacrylate; pentaerythritol triacrylate; trimethylolpropane triacrylate; caprolactone modified trimethylol propane triacrylate; ethoxylated trimethylolpropane triacrylate; propoxylated trimethylol propane triacrylate; tris (2-hydroxy ethyl) isocyanurate triacrylate; e-caprolactone modified tris (2-hydroxy ethyl) isocyanurate triacrylate; melamine acrylate oligomer; pentaerythritol tetraacrylate; ethoxylated pentaerythritol tetraacrylate; di-trimethylolpropane tetra acrylate; dipentaerythritol pentaaacrylate; dipentaerythritol hexaaacrylate; ethoxylated dipentaerythritol hexaacrylate.

Examples of monomers comprising free-radically polymerizable groups other than acrylate include N-vinyl amides. Examples of N-vinyl amides include but are not limited to N-vinylcaprolactam (NVC), N-vinyl pyrollidone (NVP), diacetone acrylamide, N-vinyl carbazole, N-acryloxyoxy ethylcyclohexanedicarboximide, N-vinyl imidazole, N-vinyl-N-methylacetamide (VIMA) or acryloyl morpholine (ACMO). Vinyl ethers such as 2-(2-vinyloxyethoxy)ethyl (meth)acrylate (VEEA, VEEM), diethylene glycol divinyl ether (DVE2), triethylene glycol divinyl ether (DVE3), ethyl vinyl ether, n-butyl vinyl ether, iso-butyl vinyl ether, tert-butyl vinyl ether, cyclohexyl vinyl ether (CHVE), 2-ethylhexyl vinyl ether (EHVE), dodecyl vinyl ether (DDVE), octadecyl vinyl ether (ODVE), 1-2-butanediol divinyl ether (BDDVE), 1-4,cyclohexanedimethanol divinylether (CHDM-di), hydroxybutyl vinylether (HBVE), 1-4-cyclohexanedimethanolmono vinylether (CHDM-mono), 1,2,4-trivinylcyclohexane (TVCH), vinylphosphonic acid dimethylester (VPA) or vinylphosphonic acid dimethyl ester (VPADME).

As well as, or in place of, free radically-polymerizable monomers any concentration and type of free-radically polymerizable oligomer, including but not restricted to polyurethane acrylates, polyester acrylates, polyether acrylates and epoxy acrylates may be used. Such oligomers may also be used to help in the dispersion of the pigments used in the flexo inks of the invention.

The inks may comprise greater than 20% of multifunctional monomers, such as greater than 30% (w/w), greater than 40% (w/w), greater than 50% (w/w), greater than 60% (w/w), or greater than 70% (w/w) multifunctional monomers, such as between 70% and 80% (w/w) multifunctional monomers.

The inks may comprise greater than 20% (w/w) difunctional monomers, such as greater than 30% (w/w), greater than 40% (w/w), greater than 50% (w/w), or greater than 60% (w/w), difunctional monomers, such as between 60% and 70% (w/w) difunctional monomers.

The inks may comprise greater than 5% (w/w) trifunctional monomers, such as greater than 10% (w/w) trifunctional monomer, or between 5% and 20% (w/w) trifunctional monomers.

Colorants

Where the compositions of the invention require colourants, suitable colorants include, but are not limited to organic or inorganic pigments and dyes. The dyes include but are not limited to azo dyes, anthraquinone dyes, xanthene dyes, azine dyes, combinations thereof and the like. Organic pigments may be one pigment or a combination of pigments, such as for instance Pigment Yellow Numbers 12, 13, 14, 17, 74, 83, 114, 126, 127, 150, 155, 174, 180, 188; Pigment Red Numbers 2, 22, 23, 48:1, 48:2, 52, 52:1, 53, 57:1, 112, 122, 166, 170, 184, 202, 266, 269; Pigment Orange Numbers 5, 16, 34, 36, 71; Pigment Blue Numbers 15, 15:3, 15:4; Pigment Violet Numbers 3, 19, 23, 27; and/or Pigment Green Number 7. Inorganic pigments may be one of the following non-limiting pigments: iron oxides, titanium dioxides, chromium oxides, ferric ammonium ferrocyanides, ferric oxide blacks, Pigment Black Number 7 and/or Pigment White Numbers 6 and 7. Other organic and inorganic pigments and dyes can also be employed, as well as combinations that achieve the colors desired.

Other Components

The energy-curable compositions of the invention may also contain other components which enable them to perform in their intended application. These other ink components include, but are not restricted to; stabilizers, wetting aids, slip agents, inert resins, antifoams, fillers, rheological aids, amine synergists, etc.

The compositions of the invention may also optionally comprise any blend of acrylic polymer or copolymer which is dissolved into it. These polymers are usually prepared by the (thermal) free radical polymerization of blends of monomers including, but not restricted to, styrene, butyl (meth) acrylate, ethyl (meth)acrylate, methyl (meth)acrylate, isobutyl (meth)acrylate. The acrylic polymer preferably has an average molecular weight of less than 20,000 g/mole and more preferably less than 10,000 g/mole. Examples of acrylic polymers include those supplied from Dianal, Elvacite Rohm and Haas and DSM, amongst others. The acrylic polymer is preferably present in the compositions at a concentration of between 2 and 20% (w/w).

Unless otherwise stated, a reference to "molecular weight" or "average molecular weight" is preferably to the number average molecular weight ($M_n$). The molecular weight can be measured by those techniques known in the art such as gel permeation chromatography. For instance, molecular weight determination may be conducted on a Hewlett-Packard 1050 Series HPLC system equipped with two GPC Ultrastyragel columns, 103 and 104 Å (5 μm mixed, 300 mm×19 mm, Waters Millipore Corporation, Milford, MA, USA) and THF as mobile phase. Preferably, molecular weight is calculated by comparison with a polystyrene standard.

A stabilizer may also be used in the composition to ensure good pot life of the ink, examples of which are nitroxy based stabilizers such as OHTEMPO, TEMPO, and Irgastab UV10. Phenolic stabilizers such as hydroquinone (HQ), methyletherhydroquinone (MEHQ), butylhydroxytoluene (BHT) and 2,6-di-tert-butyl-N, N-dimethylamino-p-cresol may also be used. Nitrosophenylhydroxylamine (NPHA) base inhibitors NPHA, amine salts, and metal salts (Al salt, N-PAL) plus the aromatic amine inhibitors diphenylamine (DPA) and phenylenediamine(PPD) may also be used. Other suitable stabilizers are florstab UV-1, UV-8, Genorad 16 and 18. Quinone methide such as found in BASF Irgastab UV-22 may also be used.

Included in the ink formulation can be a suitable de-aerator, which prevents the formation of air inclusions and pinholes in the cured coating. The following, non-limiting, products are available from EVONIK: TEGO AIREX 900, 910, 916, 920, 921, 931, 936, 940, 944, 945, 950, 962, 980, 986.

Defoamers can also be included in the formulation, which prevent the formation of foam during manufacture of the ink and also while jetting. These are particularly important with recirculating printheads. Suitable, non-limiting, defoamers include TEGO FOAMEX N, FOAMEX 1488, 1495, 3062, 7447, 800, 8030, 805, 8050, 810, 815N, 822, 825, 830,831, 835, 840,842, 843, 845, 855, 860, 883, TEGO FOAMEX K3, TEGO FOAMEX K7/K8 and TEGO TWIN 4000 available from EVONIK. Available from BYK is BYK-066N, 088, 055, 057, 1790, 020, BYK-A 530, 067A, and BYK 354.

Surface Control Additives are often used to control the surface tension of the ink which is required to adjust the wetting on the face plate of the printhead and also to give the desired drop spread on the substrate and in the case of multi pass inkjet printing wet on dry drop spread. They can also be used to control the level of slip and scratch resistance of the coating. Suitable surface control additives include but are not limited to TEGO FLOW300, 370,425, TEGO GLIDE 100, 110,130,406, 410,411, 415, 420, 432, 435, 440, 482, A115, B1484, TEGO GLIDE ZG 400, TEGO RAD2010, 2011, 2100, 2200N, 2250, 2300, 2500, 2600, 2650, 2700, TEGO TWIN 4000, 4100, TEGO WET 240, 250, 260,265, 270, 280, 500, 505, 510 and TEGO WET KL245 all available from EVONIK. Available from BYK are BYK 333,337, BYK UV3500, BYK 378, 347,361, BYK UV3530, 3570, CERAFLOUR 998, 996, NANOBYK 3601, 3610, 3650 and CERMAT 258. From Allnex EBECRYL 350, 1360, MODA-FLOW 9200, EBECRYL 341. From SARTOMER the aliphatic silicone acrylate CN9800 may be used.

The invention is further described by the following numbered paragraphs:

1. A UV-curable ink composition comprising ≤20% (w/w) of any blend of monofunctional acrylate monomers, an acrylated amine and ≤8% (w/w) of any blend of photoinitiators.
2. The composition of paragraph 1, comprising ≤6% (w/w) of any blend of photoinitiators.
3. The composition of paragraph 1, comprising ≤5% (w/w) of any blend of photoinitiators.
4. The composition of paragraph 1, comprising ≤10% (w/w) of any blend of monofunctional acrylate monomers.
5. The composition of paragraph 1, wherein the photoinitiator component comprises an acylphosphine oxide photoinitiator.
6. The composition of paragraph 5, wherein the acylphosphine oxide photoinitiator is selected from the group consisting of multifunctional, polymerizable and polymeric acylphosphine oxide.
7. The composition of paragraph 5, wherein the acylphosphine oxide photoinitiator is selected from the group consisting of diphenyl(2,4,6-trimethylbenzoyl)phosphine oxide, phenylbis(2,4,6-trimethylbenzoyl)phosphine oxide, ethyl (2,4,6-trimethylbenzoyl) phenylphosphinate, bis(2,6-dimethoxybenzoyl)-2, 4,4-trimethylpentylphosphinoxide and combinations thereof.
8. The composition of paragraph 1, wherein the photoinitiator component comprises a thioxanthone photoinitiator.
9. The composition of paragraph 8, wherein the thioxanthone photoinitiator is selected from the group consisting of any multifunctional, polymerizable or polymeric thioxanthone and combinations thereof.
10. The composition of paragraph 8, wherein the thioxanthone photoinitiator is selected from the group consisting of isopropyl thioxanthone, diethylthioxanthone, chloropropylthioxanthone, chlorothioxanthone and combinations thereof.
11. The composition of paragraph 1, wherein the aminoacrylate comprises a product derived from the Michael reaction of a multifunctional acrylate monomer or oligomer with an alkanolamine.
12. The composition of any preceding paragraph, further comprising a cellulose acetate, a cellulose acetate propionate or a cellulose acetate butyrate.
13. A process of printing and curing an ink composition, comprising applying the composition of any preceding paragraph onto a substrate and curing.
14. The process of paragraph 13, wherein the ink composition is applied by flexographic printing.
15. The process of paragraph 13, wherein the cure is accomplished by exposure to two or more separate UV irradiations from UV-LED lamps.
16. The process of paragraph 13, wherein the sum total of all the separate UV exposures is ≤400 mJ/cm$^2$.
17. The process of paragraph 13, wherein the sum total of all the separate UV exposures is ≤300 mJ/cm$^2$.
18. The process of paragraph 13, wherein the sum total of all the separate UV exposures is ≤200 mJ/cm$^2$.
19. The process of paragraph 13, wherein the sum total of all the separate UV exposures is ≤100 mJ/cm$^2$.
20. The process of paragraph 15, wherein at least one, and more preferably two, of the UV-LED lamps used in the curing process lamps is air-cooled.
21. The process of paragraph 15, wherein at least one of the UV-LED lamps used in the curing process has a peak irradiance power output of 20 W/cm$^2$, or less.
22. The process of paragraph 15, wherein at least one of the UV-LED lamps used in the curing process has a peak irradiance power output of 18 W/cm$^2$, or less.
23. The process of paragraph 15, wherein all the UV-LED lamps used in the curing process are air-cooled.
24. The process of paragraph 15, wherein at least one of the UV-LED lamps used in the curing process emits light between 365 to 405 nm.
25. A printed article comprising the composition of any one or more of paragraphs 1-12.
26. The article of paragraph 25, wherein the article is a food packaging article.

The present invention has been described in detail, including the preferred embodiments thereof. However, it will be appreciated that those skilled in the art, upon consideration of the present disclosure, may make modifications and/or improvements on this invention that fall within the scope and spirit of the invention.

EXAMPLES

The invention is further described by the following non-limiting examples which further illustrate the invention, and are not intended, nor should they be interpreted to, limit the scope of the invention.

Test Methods

Inks were prepared according to the formulations provided in Tables 1 and 2 by blending with a Dispermat type disperser.

Viscosity

Viscosity was measured with a BROOKFIELD CAP 2000+ cone and plate Viscometer at 20 RPM, using spindle 8. All measurements were taken at a temperature of 25° C.

Print Preparation

The flexo inks of Tables 1 and 2 were applied to PET film using a Harper QD hand proofer, equipped with a 3.79 BCM ceramic anilox (equivalent to an ink volume of 5.87 cm3/m2) and a rubber roller of 55 duro hardness.

The prints were then cured on a custom built GEW E2C-LA1-30-2 UV rig. The rig is equipped with air cooled GEW LA1 UV-LED lamps having a peak irradiance of 18 W/cm$^2$, at the peak wavelength of 395 nm. The prints were cured at a speed of 120 m/min, and the lamp powers were adjusted to provide the doses provided in Tables 1 and 2.

Assessing Surface Cure

To assess the surface cure, the cured ink films were blocked to the reverse, non-coated, surface of Incada Exel cartonboard substrate and blocked for 10 seconds at 5 tonnes, using a Specac hydraulic lab press. The amount of ink transferred to the cartonboard substrate was measured using a X-Rite eXact spectrophotometer, according to the CIE L*a*b* Coordinates, with the ΔL value being used as an assessment of surface cure. The ΔL value provides an indication of the amount of poorly surface-cured ink which transfers to the cartonboard substrate as a measure of an increase in darkness of the white cartonboard surface. The smaller the ΔL value the better the surface cure with a test result of <2.5 ΔL considered as an acceptable pass, and a test result of <1.0 ΔL considered to be an excellent pass.

Example 1 demonstrates the inventive process aspect of the invention. When the green ink of Table 1 is cured by the UV multi-exposure process, at a total UV dose of 100 mJ/cm², significantly superior surface cure is achieved than if the ink is cured with a single 100 mJ/cm² exposure. Subjecting the ink to four separate 25 mJ/cm² UV exposures, rather than a single 100 mJ/cm² exposure produced a borderline pass. This was achieved with a total photoinitiator concentration of 4.0% (w/w), thereby fulfilling a further aspect of the invention.

TABLE 1

Inventive Example 1 Formulation

| Raw Materials | % |
|---|---|
| Polymerisation inhibitor | 0.15 |
| Ditrimethylolpropane triacrylate (Di-TMPTA) | 9.7 |
| 1,6-hexanediol diacrylate (HDDA) | 6.5 |
| dipentaerythritol hexaaacrylate (DPHA) | 6 |
| ethoxylated trimethylol propane triacrylate (EOTMPTA) | 1 |
| Aminoacrylate GENOMER 5271 | 12 |
| Bis (2,4,6-trimethylbenzoyl) phenyl phosphine oxide (BAPO) | 1.6 |
| 2,4-diethyl thioxanthone (DETX) | 2.4 |
| Cellulose acetate butyrate | 0.5 |

TABLE 1-continued

Inventive Example 1 Formulation

| Raw Materials | % |
|---|---|
| Defoamer | 0.15 |
| Pigment Green 7 Dispersion[1] | 60 |
| Total | 100 |
| Viscosity [P] | 8.99 |
| LED curing with 5T blocking test [colour transfer] | ΔL |
| 1 exposure of 100 mJ/cm² | −7.03 |
| 2 exposures of 50 mJ/cm² | −2.64 |
| 4 exposures of 25 mJ/cm² | −2.16 |
| 10 exposures of 10 mJ/cm² | −3.39 |

Notes
to Table 1: The Pigment Green 7 Dispersion is a proprietary dispersion containing approx. 29% (w/w) of pigment green 7 along with a blend of monomers, oligomers, dispersants, stabilisers.

The curing results in Table 1 clearly exhibit the advantage of lower dose multi exposure curing vs. higher dose single exposure curing.

A further series of flexo inks were prepared according to the formulations laid out in Table 2 and cured accordingly. In this ink series the impact of aminoacrylate selection was evaluated (Examples 2 to 5), and also the inclusion of cellulose acetate butyrate, (Examples 6 and 7). The results show that Photomer 4250 is an especially effective aminoacrylate and that the addition of cellulose acetate butyrate can further promote the surface cure (Examples 6 and 7, compared with Examples 2 and 5). This latter surprising finding is therefore included as a further optional feature of the invention. It can be seen from the cure results that equivalent, or indeed superior, surface cure can be achieved with these inks when they are cured via a multi-exposure process where the total dose is less than that achievable with a single exposure (180 mJ/cm², compared with a single dose of 200 mJ/cm²).

TABLE 2

Inventive Example 2-7 Formulations

| Raw Materials | Ex 2 | Ex 3 | Ex 4 | Ex 5 | Ex 6 | Ex 7 |
|---|---|---|---|---|---|---|
| Polymerisation inhibitor | 0.15 | 0.15 | 0.15 | 0.15 | 0.15 | 0.15 |
| Ditrimethylolpropane (Di-TMPTA) | 9.7 | 9.7 | 9.7 | 9.7 | 9.7 | 9.7 |
| 1,6-hexanediol diacrylate (HDDA) | 12 | 12 | 12 | 12 | 10.8 | 10.8 |
| dipentaerythritol hexaaacrylate (DPHA) | 6 | 6 | 6 | 6 | 6 | 6 |
| Aminoacrylate GENOMER 5271 | 8 | 0 | 0 | 0 | 8 | 0 |
| Aminoacrylate Agisyn 008 | 0 | 8 | 0 | 0 | 0 | 0 |
| Aminoacrylate LAROMER PO 9103 | 0 | 0 | 8 | 0 | 0 | 0 |
| Aminoacrylate PHOTOMER 4250 | 0 | 0 | 0 | 8 | 0 | 8 |
| Bis (2,4,6-trimethylbenzoyl) phenyl phosphine oxide (BAPO) | 1.6 | 1.6 | 1.6 | 1.6 | 1.6 | 1.6 |
| 2,4-diethyl thioxanthone (DETX) | 2.4 | 2.4 | 2.4 | 2.4 | 2.4 | 2.4 |
| Cellulose acetate butyrate | 0 | 0 | 0 | 0 | 1.2 | 1.2 |
| Defoamer | 0.15 | 0.15 | 0.15 | 0.15 | 0.15 | 0.15 |
| Pigment Green 7 Dispersion[1] | 60 | 60 | 60 | 60 | 60 | 60 |
| Total | 100 | 100 | 100 | 100 | 100 | 100 |
| Viscosity [P] | 5.83 | 5.75 | 6.30 | 3.91 | 9.19 | 6.68 |
| LED curing with 5 T blocking test [colour transfer] | ΔL | | | | | |
| 1 exposure of 200 mJ/cm² [200 mJ/cm² total] | −3.10 | −2.93 | −3.05 | −1.05 | −2.01 | −0.76 |
| 3 exposures of 60 mJ/cm² [180 mJ/cm² total] | −2.41 | −2.75 | −2.34 | −0.98 | −1.94 | −0.66 |
| 2 exposures of 30 mJ/cm² and 1 exposure of 120 mJ/cm² [180 mJ/cm² total] | −1.99 | −1.92 | −1.86 | −0.74 | −1.44 | −0.76 |

The curing results in Table 2 clearly exhibit the advantage of lower dose multi exposure curing vs. higher dose single exposure curing. The curing results in Table 2 also exhibit the advantage of incorporating a cellulose acetate (e.g. cellulose acetate butyrate) into the formulation (see Ex. 6 vs. Ex. 2; and Ex. 7 vs. Ex. 5).

TABLE 3

Inventive Example 8 Formulation

| Raw Materials | % |
|---|---|
| Polymerisation inhibitor | 0.16 |
| Ditrimethylolpropane (Di-TMPTA) | 9.6 |
| 1,6-hexanediol diacrylate (HDDA) | 6.94 |
| dipentaerythritol hexaaacrylate (DPHA) | 6 |
| Aminoacrylate GENOMER 5271 | 0 |
| Aminoacrylate Agisyn 008 | 0 |
| Aminoacrylate LAROMER PO 9103 | 0 |
| Aminoacrylate PHOTOMER 4250 | 14 |
| Bis (2,4,6-trimethylbenzoyl) phenyl phosphine oxide (BAPO) | 0.9 |
| 2,4-diethyl thioxanthone (DETX) | 1.6 |
| Zirconium propionate | 0.8 |
| Pigment Green 7 Dispersion[1] | 60 |
| Total | 100 |
| LED curing with 5T blocking test [colour transfer] | |
| 1 exposure of 100 mJ/cm$^2$ [100 mJ/cm$^2$ total] | −10.05 |
| 2 exposures of 100 mJ/cm$^2$ [200 mJ/cm$^2$ total] | −1.40 |
| 4 exposures of 100 mJ/cm$^2$ [400 mJ/cm$^2$ total] | −0.26 |
| 6 exposures of 100 mJ/cm$^2$ [600 mJ/cm$^2$ total] | −0.12 |

The invention claimed is:

1. A process of printing and curing a UV-curable ink composition comprising:
   ≤20% (w/w) of any blend of monofunctional acrylate monomers;
   an acrylated amine; and
   ≤5% (w/w) of any blend of photoinitiators;
   wherein the composition does not include any mercaptans and thio-ether synergists;
   the process comprising applying the composition onto a substrate and curing; wherein the ink composition is applied by flexographic printing; wherein the cure is accomplished by exposure to two or more separate UV irradiations from UV-LED lamps; and wherein the inks are printed with a press speed of 100 m/min or greater.

2. The process of claim 1, wherein the composition comprises ≤10% (w/w) of any blend of monofunctional acrylate monomers.

3. The process of claim 1, wherein the photoinitiator component comprises an acylphosphine oxide photoinitiator.

4. The process of claim 3, wherein the acylphosphine oxide photoinitiator is selected from the group consisting of multifunctional, polymerizable and polymeric acylphosphine oxide.

5. The process of claim 3, wherein the acylphosphine oxide photoinitiator is selected from the group consisting of diphenyl(2,4,6-trimethylbenzoyl)phosphine oxide, phenylbis(2,4,6-trimethylbenzoyl)phosphine oxide, ethyl (2,4,6-trimethylbenzoyl) phenylphosphinate, bis(2,6-dimethoxybenzoyl)-2,4,4-trimethylpentylphosphinoxide and combinations thereof.

6. The process of claim 1, wherein the photoinitiator component comprises a thioxanthone photoinitiator.

7. The process of claim 6, wherein the thioxanthone photoinitiator is selected from the group consisting of any multifunctional, polymerizable or polymeric thioxanthone and combinations thereof.

8. The process of claim 6, wherein the thioxanthone photoinitiator is selected from the group consisting of isopropyl thioxanthone, diethylthioxanthone, chloropropylthioxanthone, chlorothioxanthone and combinations thereof.

9. The process of claim 1, wherein the acrylated amine comprises a product derived from the Michael reaction of a multifunctional acrylate monomer or oligomer with an alkanolamine.

10. The process of claim 1, wherein the composition further comprises a cellulose acetate.

11. The process of claim 1, wherein the composition is a flexographic ink.

12. The process of claim 1, wherein the sum total of all the separate UV exposures is ≤400 mJ/cm$^2$.

13. The process of claim 1, wherein the sum total of all the separate UV exposures is ≤300 mJ/cm$^2$.

14. The process of any claim 1, wherein the sum total of all the separate UV exposures is ≤200 mJ/cm$^2$.

15. The process of claim 1, wherein the sum total of all the separate UV exposures is ≤100 mJ/cm$^2$.

16. The process of claim 1, wherein at least one of the UV-LED lamps used in the curing process lamps is air-cooled.

17. The process of claim 1, wherein at least one of the UV-LED lamps used in the curing process has a peak irradiance power output of 20 W/cm$^2$ or less.

18. The process of claim 1, wherein at least one of the UV-LED lamps used in the curing process has a peak irradiance power output of 18 W/cm$^2$ or less.

19. The process of claim 1, wherein all the UV-LED lamps used in the curing process are air-cooled.

20. The process of claim 1, wherein the inks are printed with a press speed of 150 m/min or greater.

* * * * *